(12) United States Patent
Castegnier et al.

(10) Patent No.: US 6,288,140 B1
(45) Date of Patent: Sep. 11, 2001

(54) ELECTROCOAGULATION PRINTING INK

(75) Inventors: Adrien Castegnier, Outremont; Normand Lepine, Pointe-aux-Trembles, both of (CA)

(73) Assignee: Elcorsy Technology Inc., Saint-Laurent (CA)

( * ) Notice: Subject to any disclaimer, the term of this patent is extended or adjusted under 35 U.S.C. 154(b) by 0 days.

(21) Appl. No.: 09/430,018

(22) Filed: Oct. 29, 1999

(51) Int. Cl.[7] ............... C08L 33/02; C08L 33/26; C08K 3/16; C09D 11/10
(52) U.S. Cl. ............... 523/160; 524/555; 524/556
(58) Field of Search ............... 523/160, 161; 106/31.6, 31.64, 31.92; 524/556, 555, 599, 606

(56) References Cited

U.S. PATENT DOCUMENTS

| | | | |
|---|---|---|---|
| 4,116,896 | * 9/1978 | Garrett et al. | 524/43 |
| 4,895,629 | 1/1990 | Castegnier | 204/180.9 |
| 5,338,406 | * 8/1994 | Smith | 162/168.2 |
| 5,412,011 | * 5/1995 | Morris et al. | 524/261 |
| 5,538,601 | * 7/1996 | Castegnier | 204/486 |
| 5,693,129 | * 12/1997 | Lin | 106/31.43 |
| 5,750,593 | 5/1998 | Castegnier et al. | 523/161 |
| 5,833,744 | * 11/1998 | Breton et al. | 106/31.59 |
| 5,849,154 | * 12/1998 | Takano et al. | 162/135 |
| 5,913,971 | * 6/1999 | Fujimatsu et al. | 106/31.86 |
| 5,928,417 | 7/1999 | Castegnier et al. | 106/31.87 |

* cited by examiner

*Primary Examiner*—Vasu Jagannathan
*Assistant Examiner*—Collie E. Shosho
(74) *Attorney, Agent, or Firm*—Swabey Ogilvy Renault

(57) ABSTRACT

An electrocoagulation printing ink consisting essentially of a liquid colloidal dispersion containing an electrolytically coagulable colloid, a dispersing medium, a soluble electrolyte and a coloring agent, is improved by selecting as the colloid an anionic copolymer of acrylamide and acrylic acid having a weight average molecular weight of about 200,000 to about 400,000 and containing about 8 to about 15 weight % of carboxyl groups. The ink is free of surfactant associated with the copolymer. Such an ink is capable of forming dots of coagulated colloid which are resistant to abrasion, without producing undesirable background on the electrocoagulation printed images.

43 Claims, No Drawings

ELECTROCOAGULATION PRINTING INK

BACKGROUND OF THE INVENTION

The present invention pertains to improvements in the field of electrocoagulation printing. More particularly, the invention relates to an improved electrocoagulation printing ink.

In U.S. Pat. No. 4,895,629 of Jan. 23, 1990, Applicant has described a high-speed electrocoagulation printing method and apparatus in which use is made of a positive electrode in the form of a revolving cylinder having a passivated surface onto which dots of colored, coagulated colloid representative of an image are produced. These dots of colored, coagulated colloid are thereafter contacted with a substrate such as paper to cause transfer of the colored, coagulated colloid onto the substrate and thereby imprint the substrate with the image. As explained in this patent, the positive electrode is coated with a dispersion containing an olefinic substance and a metal oxide prior to electrical energization of the negative electrodes in order to weaken the adherence of the dots of coagulated colloid to the positive electrode and also to prevent an uncontrolled corrosion of the positive electrode. In addition, gas generated as a result of electrolysis upon energizing the negative electrodes is consumed by reaction with the olefinic substance so that there is no gas accumulation between the negative and positive electrodes.

The dispersion containing the olefinic substance and the metal oxide is applied onto the surface of the positive electrode in a manner so as to form on the electrode surface micro-droplets of olefinic substance containing the metal oxide. As described in the aforementioned patent, this may be achieved by means of a device comprising a rotatable brush provided with a plurality of radially extending horse-hair bristles having extremities contacting the electrode surface, and a distribution roller arranged in spaced-apart parallel relation to the brush such as to contact the bristles thereof at their extremities. The distribution roller has a plurality of peripheral longitudinally extending grooves and is partially immersed in a bath containing the dispersion. As the distribution roller rotates in the dispersion, the grooves are filled with the dispersion which is thus transferred to the bristles to coat the extremities thereof. Rotation of the brush, on the other hand, causes the coated bristles to transfer the dispersion onto the surface of the positive electrode and thereby form the desired micro-droplets of olefinic substance containing the metal oxide. Instead of a brush, use can be made of a roller provided with a plurality of radially extending strips of chamois leather adapted to contact the electrode surface, the strips being coated in the same manner as the bristles. Rotation of such a roller causes the coated strips to impinge upon the surface of the positive electrode such as to transfer thereon the dispersion and thereby form the desired micro-droplets of olefinic substance containing the metal oxide.

The electrocoagulation printing ink which is used to fill the gap defined between the positive and negative electrodes consists essentially of a liquid colloidal dispersion containing an electrolytically coagulable colloid, a dispersing medium, a soluble electrolyte and a coloring agent. The coloring agent can be a dye or a pigment. After coagulation of the colloid, any remaining non-coagulated colloid is removed from the surface of the positive electrode, for example, by scraping the surface with a soft rubber squeegee, so as to fully uncover the colored, coagulated colloid which is thereafter transferred onto the substrate. The surface of the positive electrode is thereafter cleaned by means of a plurality of rotating brushes and a cleaning liquid to remove any residual coagulated colloid adhered to the surface of the positive electrode.

The colloid generally used is a linear colloid of high molecular weight, that is, one having a weight average molecular weight comprised between about 100,000 and about 1,000,000. Examples of suitable colloids include natural polymers such as albumin, gelatin, casein and agar, and synthetic polymers such as polyacrylic acid, polyacrylamide and polyvinyl alcohol. When the colloid used is an anionic copolymer of acrylamide and acrylic acid, Applicant has observed that the dots of coagulated colloid produced upon electrocoagulation of such a colloid are easily scored by the rubber squeegee used to remove any remaining non-coagulated colloid from the surface of the positive electrode, thereby adversely affecting the quality of the image reproduced by electrocoagulation. In addition, since water is generally used as dispersing medium and since surfactants are generally associated with the aforesaid acrylamide copolymer to assist in dispersing the copolymer to provide the desired colloidal dispersion, the surfactants cause the colloid to retain water so that the residual non-coagulated colloid remaining on the surface of the positive electrode does not dry rapidly enough to be removed by the rubber squeegee and thus is transferred onto the substrate, thereby producing undesirable background on the electrocoagulation printed images.

SUMMARY OF THE INVENTION

It is therefore an object of the present invention to overcome the above drawbacks and to provide an improved electrocoagulation printing ink capable of forming dots of coagulated colloid which are resistant to abrasion by the above rubber squeegee, without producing undesirable background on the electrocoagulation printed images.

According to the present invention, there is provided in an electrocoagulation printing ink consisting essentially of a liquid colloidal dispersion containing an electrolytically coagulable colloid, a dispersing medium, a soluble electrolyte and a coloring agent, the improvement wherein the colloid is an anionic copolymer of acrylamide and acrylic acid having a weight average molecular weight of about 200,000 to about 400,000 and containing about 8 to about 15 weight % of carboxyl groups, and wherein the ink is free of surfactant associated with the copolymer.

Applicant has found quite unexpectedly that by selecting as the aforesaid colloid an anionic copolymer of acrylamide and acrylic acid having a weight average molecular weight of about 200,000 to about 400,000, determined by the Refractive Index method, and containing about 8 to about 15 weight % of carboxyl groups, such a colloid forms upon electrocoagulation dots of coagulated colloid which are sufficiently hard for proper resistance to abrasion, while still remaining sufficiently tacky for proper transfer onto the substrate. Elimination of the surfactant(s) associated with such a colloid, on the other hand, enables one not only to eliminate the formation of undesirable background, but also to increase the hardness of the coagulated colloid. If the carboxyl content of the colloid is less than about 8 weight %, the colloid undergoes insufficient coagulation so that the optical density of the coagulated colloid is too low. A colloid with a carboxyl content greater than about 15 weight % results in a coagulated colloid having an insufficient hardness for proper resistance to abrasion. On the other hand, if the molecular weight of the colloid is less than 200,000, proper transfer of the dots of coagulated colloid is inhibited. A colloid with a molecular weight greater than 400,000 causes an electrolytic destruction of the cathodes.

DESCRIPTION OF PREFERRED EMBODIMENTS

According to a preferred embodiment, use is made of a copolymer of acrylamide and acrylic acid having a weight average molecular weight of about 250,000 to about 350,000, preferably about 300,000. A particularly preferred copolymer is one containing about 10 weight % of carboxyl groups. The carboxyl content of the copolymer can be modified by neutralization.

Elimination of the surfactant(s) generally associated with the above colloid can be achieved by subjecting a dilute dispersion of the colloid to ultra-filtration. The colloid is preferably used in an amount of about 6.5 to about 12% by weight, and more preferably in an amount of about 7% by weight, based on the total weight of the ink. Water is preferably used as the medium for dispersing the colloid to provide the desired colloidal dispersion.

The ink also contains a soluble electrolyte. Preferred electrolytes for causing the desired breakdown of the passive oxide film on the positive electrode surface include alkali metal halides and alkaline earth metal halides, such as lithium chloride, sodium chloride, potassium chloride and calcium chloride. The electrolyte is preferably used in an amount of about 6% to about 9% by weight, based on the total weight of the ink.

The coloring agent can be a dye or a pigment. Examples of suitable dyes which may be used to color the colloid are the water soluble dyes available from HOECHST such as Duasyn Acid Black for coloring in black and Duasyn Acid Blue for coloring in cyan, or those available from RIEDEL-DEHAEN such as Anti-Halo Dye Blue T. Pina for coloring in cyan, Anti-Halo Dye AC Magenta Extra V01 Pina for coloring in magenta and Anti-Halo Dye Oxonol Yellow N. Pina for coloring in yellow.

Where the coloring agent used is a pigment, it is necessary to add a dispersing agent for uniformly dispersing the pigment in the ink. Preferably, the dispersing agent is an alkali metal salt of a naphthalenesulfonic acid-formaldehyde polycondensate having the general formula:

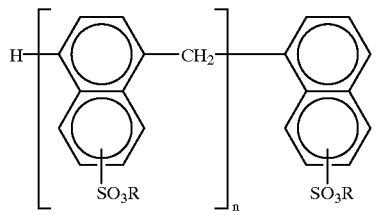

(I)

in which R is an alkali metal and n is an integer ranging from about 5 to about 12.

As explained in Applicant's U.S. Pat. No. 5,928,417 of Jul. 27, 1999, the teaching of which is incorporated herein by reference, by using a naphthalenesulfonic acid-formaldehyde polycondensate alkali metal salt of the above formula (I), the shelf-life of the electrocoagulation printing ink is increased to at least several months and the viscosity more stable, ranging from about 300 to about 400 cp. Moreover, the use of the polymer of formula (I) enables one to increase the optical density of the coagulated colloid to about 1.40–1.50, to reduce the optical density of colored background on electrocoagulation printed images to about 0.02 and also to significantly reduce the gas generation at the negative electrodes.

The pigment is preferably used in an amount of about 6.5 to about 15% by weight, and the dispersing agent in an amount of about 0.1 to about 2% by weight, based on the total weight of the ink. Use can be made of the pigments which are available from CABOT CORP. such as Carbon Black Monarch® 120 for imparting a black color to the colloid, or those available from HOECHST such as Hostaperm Blue B2G or B3G for imparting a cyan color, Permanent Rubine F6B or L6B for imparting a magenta color and Permanent Yellow DGR or DHG for imparting a yellow color to the colloid. The dispersing agent used is preferably an anionic polymer of formula (I) in which R is sodium and n is 7. Such a polymer is sold by Boehme Filatex Canada Inc. under the trade-mark CLOSPERSE 2500 and has a weight average molecular weight of about 2000.

According to another preferred embodiment of the invention, the ink further includes a sequestering agent for complexing metal ions generated during electrocoagulation printing. The sequestering agent is present in an amount to prevent the metal ions from causing the colloid to undergo undesirable cross-linking, without adversely affecting electrocoagulation of the colloid. As explained in Applicant's U.S. Pat. No. 5,750,593 of May 12, 1998, the teaching of which is incorporated herein by reference, where a positive electrode made of stainless steel or aluminum is utilized in Applicant's electrocoagulation printing method, dissolution of the passive oxide film on such an electrode generates $Fe^{3+}$ or $Al^{3+}$ ions which then initiate coagulation of the colloid. Metal ions such as the trivalent ions $Fe^{3+}$ and $Al^{3+}$, on the other hand, are very efficient bridging agents for cross-linking colloids, particularly polyacrylamides. Applicant has found through analysis of various ink samples taken at different printing stages and time intervals that the ink contains iron or aluminum ions depending on whether the positive electrode used is made of stainless steel or aluminum and that the concentration of these metal ions increases in time during electrocoagulation printing. These metal ions are believed to be generated by the friction of the aforementioned bristles or chamois leather strips on the surface of the positive electrode as well as by the friction of the cleaning brushes used for cleaning the latter. Minor leaks from the system used for removing non-coagulated ink from the positive electrode surface after electrocoagulation of the colloid has taken place, which contains iron or aluminum ions released from the positive electrode surface but not consumed by coagulation of the colloid, also contaminate the ink. In addition, the paper onto which the dots of coagulated colloid are transferred contains metal ion contaminants and these are released onto the positive electrode surface upon contact of the paper with the latter. All these metal ion contaminants cross-link the colloid contained in the ink, resulting in a viscosity increase leading to an ultimate gelation of the ink.

The amount of sequestering agent necessary to prevent the metal ions generated during the electrocoagulation printing from causing an undesirable cross-linking of the colloid depends on the sequestering agent used as well as on the concentration of metal ions which causes an undesirable cross-linking of the colloid and which, in turn, depends on the type of colloid contained in the ink. The amount of sequestering agent added, on the other hand, should not adversely affect the electrocoagulation of the colloid since a too large quantity may also complex the metal ions which are released from the positive electrode surface during passive film breakdown and which are essential to the coagulation of the colloid. Applicant has found that, for most colloids, when the concentration of ferric ions which cause the colloid to cross-link is generally above 25 ppm, the ink is too viscous for proper working and, at about 140 ppm, there is gelation of the ink. Thus, according to a preferred embodiment of the invention, the sequestering agent is added in an amount such that no more than about 20 ppm, and preferably no more than about 15 ppm, of ferric ions cause the colloid to cross-link. Therefore, the concentration of complexed metal ions in the ink may be quite high and reach several hundred ppm, provided that in Applicant's preferred embodiment, no more than about 20 ppm of ferric ions cross-link the colloid.

The expression "electrocoagulation printing" as used herein refers to the entire printing process by which an image is reproduced by electrocoagulation of an electrolytically electrocoagulable colloid and the image thus reproduced is transferred onto a substrate, such as paper. The entire printing process thus includes the steps of (a) cleaning the positive electrode surface, (b) coating the latter with an olefinic substance and a metal oxide, (c) filling the electrode gap with the aforementioned colloidal dispersion, (d) electrically energizing selected negative electrodes to form on the olefin and metal oxide-coated positive electrode surface a series of dots of colored, coagulated colloid representative of a desired image, (e) removing any remaining non-coagulated colloid from the positive electrode surface and (f) contacting the dots of colored, coagulated colloid with a substrate to cause transfer of the colored, coagulated colloid onto the substrate.

The expression "electrocoagulation of the colloid" as used herein refers only to step (d) of the above process, which involves breakdown of the passive oxide film on the positive electrode surface, release of metal ions from the positive electrode surface, coagulation of the colloid and formation of dots of coagulated colloid on the positive electrode surface.

The sequestering agent used is preferably a chelating agent which forms ring structures incorporating the metal ions as central metal atoms. Such a ring formation increases the stability of the metal-chelating agent bonding. A preferred class of chelating agents comprises polyaminocarboxylic acids and their salts which are sold by Ciba-Geigy Corporation under the trade-marks SEQUESTRENE and CHEL. Examples of such polyaminocarboxylic acids include ethylenediaminetetraacetic acid (EDTA), diethylenetriaminepentaacetic acid (DTPA), ethylene-bis (oxyethylenenitrilo)tetraacetic acid (EGTA) and hydroxyethylethylenediaminetriacetic acid (HEDTA). These chelating agents are preferably used in an amount of about 0.01 to about 0.2% by weight, based on the total weight of the ink.

Particularly preferred chelating agents are EDTA and its salts which are readily available at low cost. Where the ink is to be used as a working ink for approximately one hour of printing or as a starting ink for the starting of a continuous printing lasting several hours with intermittent additions of replenishing ink, the EDTA or salt thereof is preferably used in an amount of about 0.01 to about 0.2% by weight, and more preferably in an amount of about 0.1% by weight in the case of a working ink and about 0.02% by weight in the case of a starting ink, based on the total weight of the ink. In the case of a replenishing ink, the EDTA or salt thereof is preferably used in an amount of about 0.02 to about 0.2% by weight and more preferably in an amount of about 0.15% by weight, based on the total weight of the ink.

The ink according to the invention preferably includes a biocidal agent for preventing the growth of fungii, molds and the like. A preferred biocidal agent is the one sold by Gray Products under the trade-mark PARMETOL K-50. The biocidal agent is preferably used in an amount of about 0.1 to about 1% by weight, based on the total weight of the ink.

A preferred ink formulation for use as either a working or starting ink consists essentially of an aqueous colloidal dispersion having a pH of about 4 to about 5 and containing about 60 to about 80% by weight of water, about 6.5 to about 12% by weight of the aforesaid anionic acrylamide copolymer, about 6% to about 9% by weight of an alkali metal chloride, about 6.5 to about 15% by weight of a pigment, about 0.1 to about 2% by weight of an anionic dispersing agent, about 0.01 to about 0.09% by weight of ethylenediaminetetraacetic acid or a salt thereof and about 0.1 to about 1% by weight of a biocidal agent, based on the total weight of the ink. A preferred ink formulation for use as a replenishing ink, on the other hand, consists essentially of an aqueous colloidal dispersion having a pH of about 4 to about 5 and containing about 60 to about 80% by weight of water, about 6.5 to about 12% by weight of the aforesaid anionic acrylamide copolymer, about 6.5 to about 9% by weight of an alkali metal chloride, about 6.5 to about 15% by weight of a pigment, about 0.1 to about 2% by weight of an anionic dispersing agent, about 0.1 to about 0.2% by weight of ethylene-diaminetetraacetic acid or a salt thereof and about 0.1 to about 1% of a biocidal agent, based on the total weight of the ink.

The following non-limiting examples illustrate the invention.

EXAMPLE 1

A cyan colored ink composition useful as a working ink was prepared from the following ingredients:

| | |
|---|---|
| Demineralized water | 72.18 wt. % |
| Hostaperm Blue B2G pigment | 10.49 wt. % |
| Anionic dispersing agent sold under the trade-mark CLOSPERSE 2500 | 1.78 wt. % |
| Surfactant-free anionic acrylamide copolymer sold under the trade-mark ACCOSTRENGTH 86, having a weight average molecular weight of about 250,000 and modified to exhibit a carboxyl content of about 12 wt. % | 6.99 wt. % |
| Potassium chloride | 8.39 wt. % |
| Disodium EDTA dehydrate sold under the trade-mark SEQUESTRENE NA2 | 0.03 wt. % |
| Biocidal agent sold under the trade-mark PARMETOL K-50 | 0.14 wt. % |
| | 100.00 wt. % |

The pigment was first dispersed into the water with the dispersing agent, using a ball grinder. The acrylamide polymer was then added to the resulting dispersion, followed by the addition of the potassium chloride and the biocidal agent. The chelating agent SEQUESTRENE NA2 was thereafter admixed. The aqueous colloidal dispersion thus obtained had a pH of about 4.5.

The above working ink was used in an electrocoagulation printing apparatus of the type described in Applicant's aforementioned U.S. Pat. No. 4,895,629. The viscosity of the ink during electrocoagulation printing was about 360 cp and remained substantially constant for a period of about one hour. The dots of colored, coagulated colloid produced with such an ink had an optical density of 1.45 and were resistant to abrasion.

EXAMPLE 2

A yellow colored ink composition useful as a starting ink was prepared from the following ingredients:

| | |
|---|---|
| Demineralized water | 71.18 wt. % |
| Permanent Yellow DGR pigment | 11.72 wt. % |
| Anionic dispersing agent sold under the trade-mark CLOSPERSE 2500 | 1.76 wt. % |
| Surfactant-free anionic acrylamide copolymer sold under the trade-mark ACCOSTRENGTH 85, having a weight average molecular weight of about 300,000 and modified to exhibit a carboxyl content of about 10 wt. % | 6.90 wt. % |
| Potassium chloride | 8.28 wt. % |
| Disodium EDTA dehydrate sold under the trade-mark SEQUESTRENE NA2 | 0.02 wt. % |
| Biocidal agent sold under the trade-mark PARMETOL K-50 | 0.14 wt. % |
| | 100.00 wt. % |

A yellow colored ink composition useful as a replenishing ink was also prepared from the following ingredients:

| | |
|---|---|
| Demineralized water | 72.37 wt. % |
| Permanent Yellow DGR pigment | 10.81 wt. % |
| Anionic dispersing agent sold under the trade-mark CLOSPERSE 2500 | 1.62 wt. % |
| Surfactant-free anionic acrylamide copolymer sold under the trade-mark CCOSTRENGTH A 85, having a weight average molecular weight of about 300,000 and modified to exhibit a carboxyl content of about 10 wt. % | 6.36 wt. % |
| Potassium chloride | 8.55 wt. % |
| Disodium EDTA dehydrate sold under the trade-mark SEQUESTRENE NA2 | 0.15 wt. % |
| Biocidal agent sold under the trade-mark PARMETOL K-50 | 0.14 wt. % |
| | 100.00 wt. % |

Both the starting ink and the replenishing ink were prepared in the same manner as the working ink of Example 1.

The above starting ink was used to start a continuous printing lasting several hours, in the same electrocoagulation printing apparatus as in Example 1. As the level of the ink in the ink feeder diminished, the ink was replenished with the above replenishing ink to maintain a constant ink level. The ink viscosity was about 350 cp and remained substantially constant during the entire printing. The dots of colored, coagulated colloid produced with such an ink had an optical density of 1.45 and were resistant to abrasion.

EXAMPLE 3

Example 1 was repeated with the exception that the pigment and the chelating agent in the working ink were respectively Permanent Rubine F6B and EDTA sold under the trade-mark SEQUESTRENE AA. Essentially the same results were obtained.

EXAMPLE 4

Example 1 was repeated with the exception that the pigment and the chelating agent in the working ink were respectively Carbon Black Monarch ® 120 and DTPA sold under the trade-mark CHEL DTPA. The amounts of pigment and dispersing agent used were 9.0 wt. % and 0.31 wt. % respectively; the amount of demineralized water was 76.14 wt. %. Essentially the same results were obtained.

We claim:

1. In an electrocoagulation printing ink consisting essentially of a liquid colloidal dispersion containing an electrolytically coagulable colloid, a dispersing medium, a soluble electrolyte and a coloring agent, the improvement wherein said colloid is an anionic copolymer of acrylamide and acrylic acid having a weight average molecular weight of about 200,000 to about 400,000 and containing about 8 to about 15 weight % of carboxyl groups, and wherein said ink is free of surfactant associated with said copolymer.

2. An ink as claimed in claim 1, wherein said copolymer has a weight average molecular weight of about 250,000 to about 350,000.

3. An ink as claimed in claim 2, wherein said copolymer has a weight average molecular weight of about 300,000.

4. An ink as claimed in claim 1, wherein said copolymer contains about 10 weight % of carboxyl groups.

5. An ink as claimed in claim 1, wherein said copolymer is present in an amount of about 6.5 to about 12% by weight, based on the total weight of the ink.

6. An ink as claimed in claim 5, wherein the amount of copolymer is about 7% by weight.

7. An ink as claimed in claim 1, wherein said dispersing medium is water and said electrolyte is selected from the group consisting of alkali metal halides and alkaline earth metal halides.

8. An ink as claimed in claim 7, wherein said electrolyte is present in an amount of about 6% to about 9% by weight, based on the total weight of the ink.

9. An ink as claimed in claim 1, wherein said coloring agent is a pigment and wherein said colloidal dispersion further includes a dispersing agent for uniformly dispersing said pigment into said dispersion.

10. An ink as claimed in claim 9, wehrein said dispersing agent is an alkali metal salt of a naphthalenesulfonic acid-formaldehyde polycondensate having the general formula:

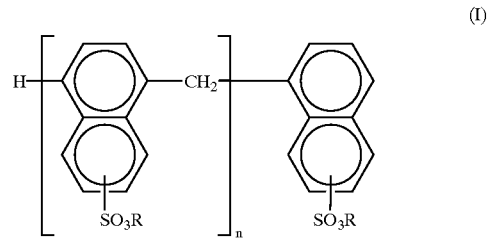

(I)

in which R is an alkali metal and n is an integer ranging from about 5 to about 12.

11. An ink as claimed in claim 10, wherein said dispersing agent is a naphthalenesulfonic acid-formaldehyde polycondensate alkali metal salt of the formula (I) in which R is sodium and n is 7.

12. An ink as claimed in claim 10, wherein said pigment is present in an amount of about 6.5 to about 15% by weight, based on the total weight of the ink.

13. An ink as claimed in claim 12, wherein said dispersing agent is present in an amount of about 0.1 to about 2% by weight, based on the total weight of the ink.

14. An ink as claimed in claim 1 further including a sequestering agent for complexing metal ions generated during electrocoagulation printing, said sequestering agent being present in an amount to prevent said metal ions from causing said colloid to undergo undesirable cross-linking, without adversely affecting electrocoagulation of said colloid.

15. An ink as claimed in claim 14, wherein said metal ions are trivalent ions.

16. An ink as claimed in claim 15, wherein said trivalent ions are aluminum or ferric ions.

17. An ink as claimed in claim 16, wherein said trivalent ions are ferric ions and wherein said sequestering agent is present in an amount such that no more than about 20 ppm of ferric ions cause said colloid to cross-link.

18. An ink as claimed in claim 17, wherein said sequestering agent is present in an amount such that no more than about 15 ppm of ferric ions cause said colloid to cross-link.

19. An ink as claimed in claim 14, wherein said sequestering agent is a chelating agent selected from the group consisting of polyaminocarboxylic acids and salts thereof.

20. An ink as claimed in claim 19, wherein said chelating agent is a polyaminocarboxylic acid selected from the group consisting of ethylenediaminetetraacetic acid, diethylenetriaminepentaacetic acid, ethylene-bis(oxyethylenenitrilo) tetraacetic acid and hydroxyethylethylenediaminetriacetic acid, or a salt thereof.

21. An ink as claimed in claim 20, wherein said chelating agent is present in an amount of about 0.01 to about 0.20% by weight, based on the total weight of the ink.

22. An ink as claimed in claim 20, wherein said chelating agent is ethylenediaminetetraacetic acid or a salt thereof.

23. An ink as claimed in claim 22, wherein said chelating agent is present in an amount of about 0.01 to about 0.09% by weight, based on the total weight of the ink.

24. An ink as claimed in claim 23, wherein the amount of said chelating agent is about 0.02% by weight.

25. An ink as claimed in claim 23, wherein the amount of said chelating agent is about 0.03% by weight.

26. An ink as claimed in claim 22, wherein said chelating agent is present in an amount of about 0.02 to about 0.2% by weight, based on the total weight of the ink.

27. An ink as claimed in claim 26, wherein the amount of said chelating agent is about 0.15% by weight.

28. An ink as claimed in claim 1, further including a biocidal agent.

29. An ink as claimed in claim 28, wherein said biocidal agent is present in an amount of about 0.1 to about 1% by weight, based on the total weight of the ink.

30. An electrocoagulation printing ink consisting essentially of an aqueous colloidal dispersion having a pH of about 4 to about 5 and containing about 60 to about 80% by weight of water, about 6.5 to about 12% by weight of an electrolytically coagulable colloid, about 6 to about 9% by weight of an alkali metal chloride, about 6.5 to about 15% by weight of a pigment, about 0.1 to about 2% by weight of an anionic dispersing agent, about 0.01 to about 0.09% by weight of ethylenediaminetetraacetic acid or a salt thereof and about 0.1 to about 1% by weight of a biocidal agent, based on the total weight of the ink, wherein said colloid is an anionic copolymer of acrylamide and acrylic acid having a weight average molecular weight of about 200,000 to about 400,000 and containing about 8 to about 15 weight % of carboxyl groups, and wherein said ink is free of surfactant associated with said copolymer.

31. An ink as claimed in claim 30, wherein said copolymer has a weight average molecular weight of about 250,000 to about 350,000.

32. An ink as claimed in claim 31, wherein said copolymer has a weight average molecular weight of about 300,000.

33. An ink as claimed in claim 30, wherein said copolymer contains about 10 weight % of carboxyl groups.

34. An ink as claimed in claim 30, wehrein said dispersing agent is an alkali metal salt of a naphthalenesulfonic acid-formaldehyde polycondensate having the general formula:

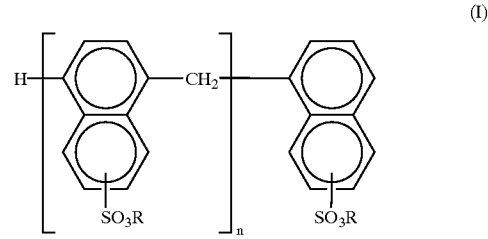

in which R is an alkali metal and n is an integer ranging from about 5 to about 12.

35. An ink as claimed in claim 34, wherein said dispersing agent is a naphthalenesulfonic acid-formaldehyde polycondensate alkali metal salt of the formula (I) in which R is sodium and n is 7.

36. An ink as claimed in claim 30, wherein the amount of ethylenediaminetetraacetic acid or salt thereof is about 0.03% by weight.

37. An electrocoagulation printing ink consisting essentially of an aqueous colloidal dispersion having a pH of about 4 to about 5 and containing about 60 to about 80% by weight of water, about 6.5 to about 12% by weight of an electrolytically coagulable colloid, about 6.5 to about 9% by weight of an alkali metal chloride, about 6.5 to about 15% by weight of a pigment, about 0.1 to about 2% by weight of an anionic dispersing agent, about 0.1 to about 0.2% by weight of ethylenediaminetetraacetic acid or a salt thereof and about 0.1 to about 1% of a biocidal agent, based on the total weight of the ink, wherein said colloid in an anionic copolymer of acrylamide and acrylic acid having a weight average molecular weight of about 200,000 to about 400,000 and containing about 8 to bout 15 weight % of carboxyl groups, and wherein said in is free of surfactant associated with said copolymer.

38. An ink as claimed in claim 37, wherein said copolymer has a weight average molecular weight of about 250,000 to about 350,000.

39. An ink as claimed in claim 38, wherein said copolymer has a weight average molecular weight of about 300,000.

40. An ink as claimed in claim 37, wherein said copolymer contains about 10 weight % of carboxyl groups.

41. An ink as claimed in claim 37, wehrein said dispersing agent is an alkali metal salt of a naphthalenesulfonic acid-formaldehyde polycondensate having the general formula:

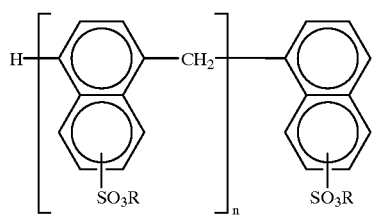

(I)

in which R is an alkali metal and n is an integer ranging from about 5 to about 12.

42. An ink as claimed in claim 41, wherein said dispersing agent is a naphthalenesulfonic acid-formaldehyde polycondensate alkali metal salt of the formula (I) in which R is sodium and n is 7.

43. An ink as claimed in claim 37, wherein the amount of ethylenediaminetetraacetic acid or salt thereof is about 0.15% by weight.

* * * * *

UNITED STATES PATENT AND TRADEMARK OFFICE
CERTIFICATE OF CORRECTION

PATENT NO.    : 6,288,140 B1
DATED         : September 11, 2001
INVENTOR(S)   : Castegnier et al.

It is certified that error appears in the above-identified patent and that said Letters Patent is hereby corrected as shown below:

Column 8,
Line 37, replace "wehrein" with -- wherein --;

Column 10,
Line 49, replace "bout" with -- about --;
Line 50, replace "in" with -- ink --;
Line 64, replace "wehrein" with -- wherein --.

Signed and Sealed this

Fourth Day of March, 2003

JAMES E. ROGAN
*Director of the United States Patent and Trademark Office*